May 24, 1927.

H. W. LANE

FOOT ACCELERATOR

Filed June 19, 1926

1,629,919

INVENTOR.

Henry W. Lane

Patented May 24, 1927.

1,629,919

UNITED STATES PATENT OFFICE.

HENRY W. LANE, OF IONE, CALIFORNIA.

FOOT ACCELERATOR.

Application filed June 19, 1926. Serial No. 117,105.

My invention relates to improvements in foot accelerators, and more particularly to that class of foot accelerators used in automobiles, and the objects of my improvements are: first, to provide a foot accelerator for automobiles, aeroplanes, or other motor vehicles, which will not tire the driver, by permitting the foot to rest in a natural position on the floor-board at all times, or to move the foot forward or backward to change the position of and thereby rest the muscles of the leg whenever desired without interfering with the operation of the accelerator; second, to secure an even feed at the carbureter over rough roads by providing for a horizontal movement of the foot whereby the foot is always resting on the floor; third, to provide a gear reduction means which insures steady and even opening or closing of the throttle; and fourth, to permit the use of light parts by so constructing the accelerator that it will always operate on the tension principle so that light connecting wires may be used.

Other objects and advantages will be referred to in the claims and shown in the drawings in which:

Like numbers designate similar parts throughout the several views.

Figure 1:
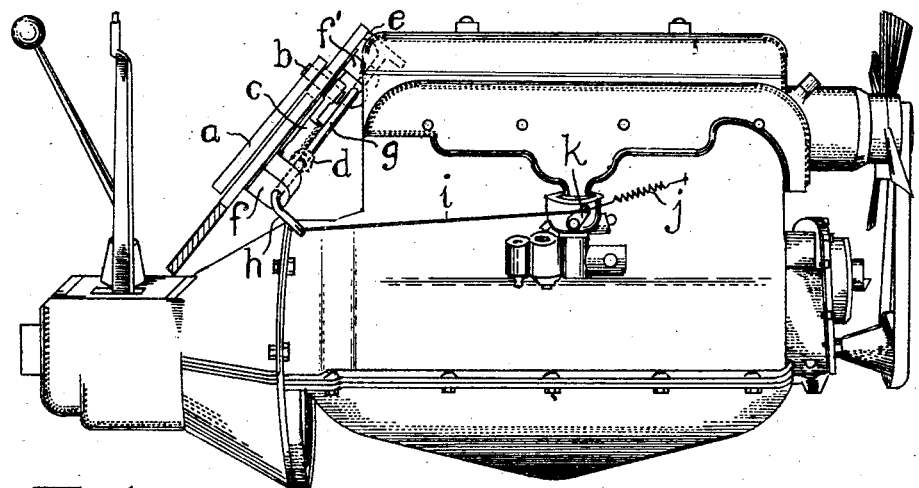
Figure 1 is a side elevation of an automobile engine and part of the floor equipped with my accelerator.
Figure 2:
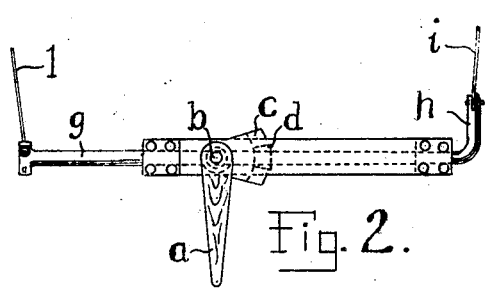
Fig. 2 is a plan view of the accelerator separate from the car or motor.
Figure 3:
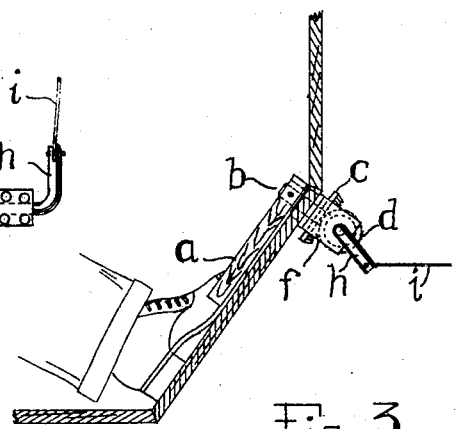
Fig. 3 is an end elevation partly in section of the accelerator secured to the floor board.
Figure 4:
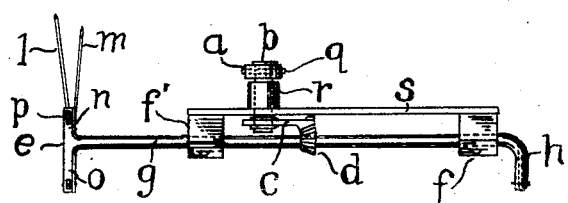
Fig. 4 is a side elevation of the accelerator in which the floor board is not shown.

A short shaft ($b$) extends through the floor board and to its upper end is rigidly secured a foot lever ($a$) by means of a pin ($q$) and on its lower end is rigidly secured a sector ($c$) provided with teeth which mesh with a pinion ($d$) keyed to shaft ($g$). The shaft ($g$) carries at one end a T lever ($e$) and at the other end an L lever from which wires ($i$) and ($l$) lead to the carbureter lever ($k$) and to the hand throttle lever respectively. $f$ and $f'$ are blocks in which the shaft ($g$) has its bearings. ($j$) is a coil spring which serves to close the throttle when the foot lever ($a$) or hand throttle is released.

On automobiles in which the carbureter is located on the left side of the engine the wire ($i$) leads from the lever arm ($o$) to the carbureter, in which case lever arm ($h$) is not required. Wire ($l$) leading from the arm ($n$) to the hand throttle lever is adapted to slide or move longitudinally in a slot provided in the end of arm ($n$) when the throttle is opened by means of the foot lever ($a$). On the end of wire ($l$) is provided a button or stop means ($p$) which, when the throttle is opened by hand bears against the lever ($n$) causing the shaft ($g$) to turn.

A bushing ($r$) is rigidly secured to bar ($s$) and extends through the floor board to form a bearing for shaft ($b$), and ($q$) is a pin to prevent lever ($a$) from turning on shaft ($b$).

To open the throttle with this accelerator the foot rests on the floor board preferably on the left side of, and adjacent to the lever ($a$) and a side movement of that part of the foot engaging the lever causes it to turn and thereby turn the shaft ($b$) in its bearing ($r$) this turns the sector ($c$), the teeth of which mesh with and turn the beveled pinion ($d$) and as this pinion is keyed to shaft ($g$) the shaft will also turn in its bearings thus moving the lever ($h$) downward and toward the rear of the car which also draws wire ($i$) rearward and opens the throttle valve of the carbureter. When the side pressure is removed from the foot lever the coil spring ($j$) will draw the wire forward and reverse the movement just described.

As wire ($l$) connects lever ($n$) with a hand throttle lever of any type, when the throttle is operated by hand the wire ($l$) is drawn forward and the stop button ($p$) bears against the end of lever ($n$) thus turning shaft ($g$) and opening the carbureter.

When the foot lever is used to open the throttle the wire ($l$) does not move but as the end of the lever ($n$) turns it moves forward on the wire ($l$) without moving the hand lever.

I do not wish to limit my invention to the mechanism shown, it being understood that either gears or lever means may be employed without departing from the scope of this invention.

What I claim and wish to secure by Letters Patent is:—

1. A foot accelerator including a foot lever fulcrumed near the forward part of the toe board and adapted to move in a plane parallel therewith, a shaft rigidly secured to and extending substantially at right angles from the foot lever, a sector provided with rack teeth and rigidly secured to said shaft, a substantially horizontal shaft carrying a beveled pinion meshing with the teeth of the sector and provided with an arm lever from which a connection leads to the carbureter throttle, and an arm having an overrunning connecting means with the hand throttle.

2. A foot accelerator comprising a rotatable shaft provided with a lever extending radially from its upper end, a sector provided with gear teeth which is rigidly secured to the lower end of said shaft, a horizontal shaft provided with lever arms at both ends and having a pinion keyed to it which meshes with the gear teeth of the sector, a brace bar extending parallel with the horizontal shaft and to which is secured radial and longitudinal bearings for the above mentioned rotatable shaft and horizontal shaft respectively and connections between a lever arm and the carbureter throttle valve and a lever arm and the hand throttle.

3. A foot accelerator including a foot lever adapted to move in a plane substantially parallel with the toe board, a shaft having its longitudinal axis perpendicular to the plane of the toe board, a shaft having its longitudinal axis at right angles to the first mentioned shaft, a connecting means between the two shafts whereby a rotary movement may be induced in one shaft by the other, connecting means between the hand throttle lever and a lever on the accelerator.

4. A foot accelerator comprising a shaft having its longitudinal axes perpendicular to the plane of the floor board, a lever extending radially from said shaft, a horizontal shaft provided with lever arms, a rack and beveled pinion connection between these two shafts, a slot or eye provided in the end of one of the arms and adapted to receive a wire having a stop means and to permit said wire to move lengthwise in said slot or eye.

HENRY W. LANE.